Nov. 2, 1926.
Re. 16,452
A. HENDERSON
CONCRETE BUILDING CONSTRUCTION
Original Filed July 15, 1921 3 Sheets-Sheet 1
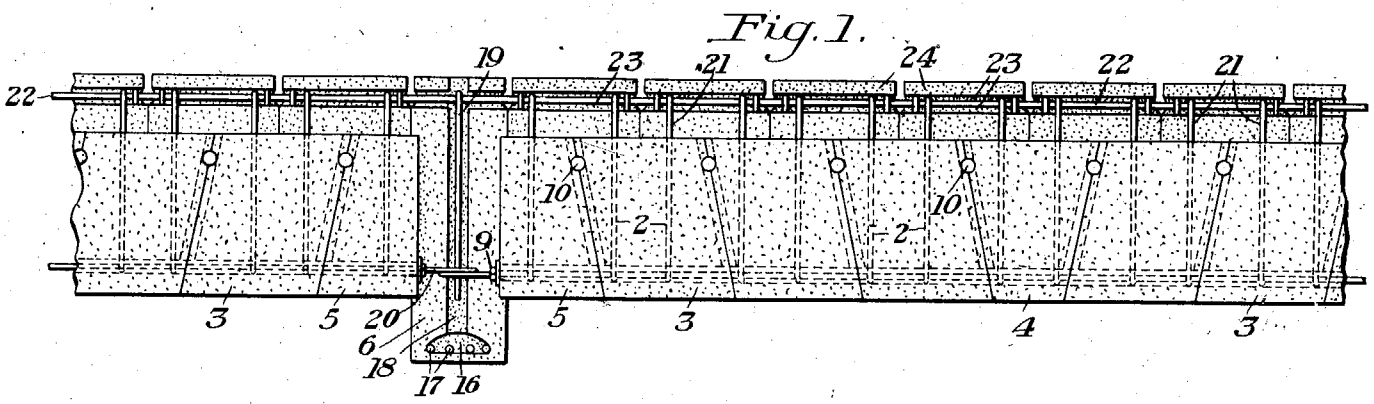
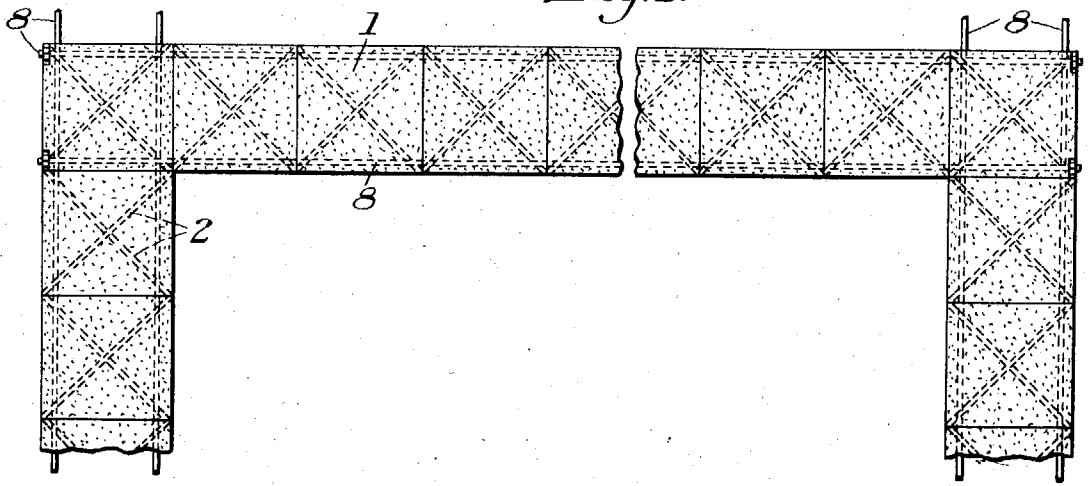
INVENTOR
Albert Henderson
By Byrnes, Stubbs, Cornuke
His Attys Nov. 2, 1926.
Re. 16,452
A. HENDERSON
CONCRETE BUILDING CONSTRUCTION
Original Filed July 15, 1921 3 Sheets-Sheet 2
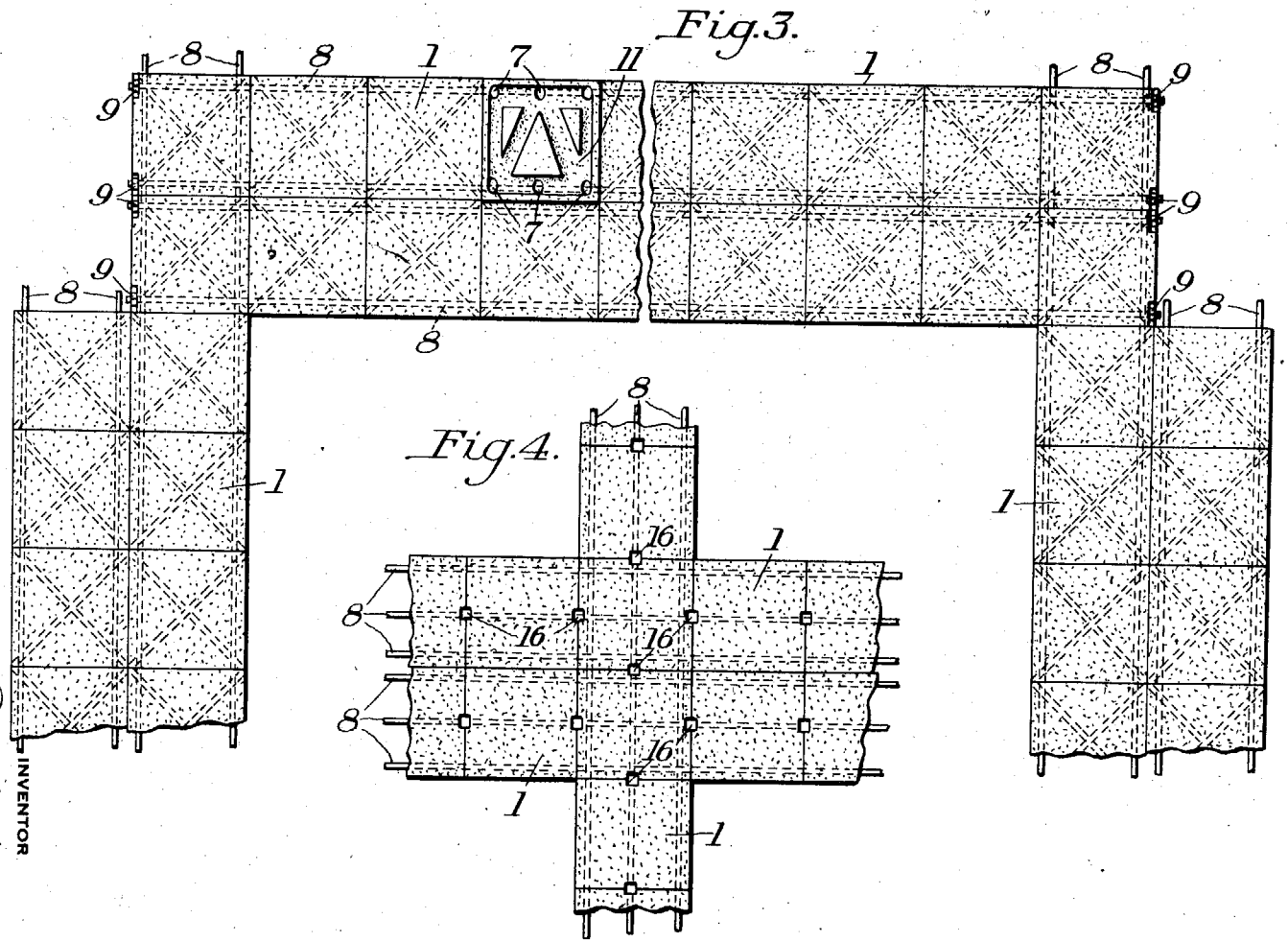
INVENTOR
Albert Henderson
By Byrnes, Stebbins & Bernick
His Attys Nov. 2, 1926.

Re. 16,452

A. HENDERSON

CONCRETE BUILDING CONSTRUCTION

Original Filed July 15, 1921 3 Sheets-Sheet 3

INVENTOR

Albert Henderson

By Byrnes, Stiffins & Bernhe

His Attys

Reissued Nov. 2, 1926.

Re. 16,452

UNITED STATES PATENT OFFICE.

ALBERT HENDERSON, OF PITTSBURGH, PENNSYLVANIA, ASSIGNOR, BY MESNE ASSIGNMENTS, TO HENDERSON STRUCTURAL UNITS COMPANY, OF PITTSBURGH, PENNSYLVANIA, A CORPORATION OF DELAWARE.

CONCRETE BUILDING CONSTRUCTION.

Original No. 1,445,945, dated February 20, 1923, Serial No. 484,967, filed July 15, 1921. Application for reissue filed April 1, 1924. Serial No. 703,547.

This application is a continuation in part of an application filed by me September 24, 1920, Serial No. 412,581. The present invention relates especially to concrete beams and girders and has for its object the provision of means whereby blocks molded at a central plant may be assembled into a beam or girder or into a column at any desired point. Secondary objects of the invention are to provide a construction whereby the blocks may be easily joined so that the completed structure will form a monolithic mass; to provide novel means for effecting the joining of adjacent blocks, and also to provide means whereby the blocks will be particularly adapted to hold a floor or other structural elements in place. The invention is illustrated in the accompanying drawings and will be hereinafter first fully described and then particularly pointed out in the appended claims.

In the drawings:

Figure 1 is a side elevation of a portion of a beam showing one embodiment of my invention;

Figure 2 is a similar view showing another embodiment of the invention;

Figure 3 is a side elevation showing the invention embodied in a beam and column of larger dimensions than those appearing in Figure 2;

Figure 4 is a plan view of a beam and girder showing the junction of the same;

Figure 5:
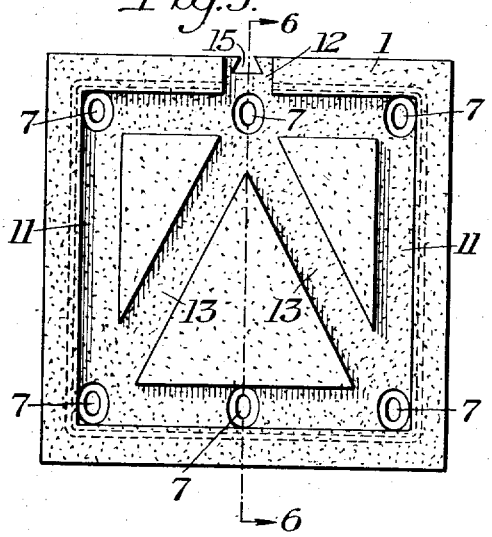
Figure 5 is an end view of one of the blocks.

In carrying out my invention, I employ a plurality of blocks 1 which are formed of concrete and are molded at a central plant, reinforcements 2, when employed, being embedded in the blocks during the molding of the same. These reinforcements 2 may be wires or rods of steel having any desired configuration and may be employed in any desired arrangement or may be omitted if preferred. In Figure 1, I have shown blocks 3 having inclined sides, a keystone block 4, and an end block 5 having one vertical side, the end blocks being adapted to fit in recesses in the sides of a girder 6 and the other blocks being readily assembled into a beam or arch, as will be readily understood. In the remaining figures of the drawing, I have shown a block, all of the sides of which are at right angles to the meeting sides, and either form of block may be employed without involving a departure from my invention. Whether the block be of the shape shown in Figure 1 or of the shape shown in the other figures, it is provided with longitudinal passages 7 therethrough to receive tie rods 8, and nuts 9 or other clamping elements are fitted upon the ends of these tie rods so that when the nuts are turned home all the blocks in a given beam or girder or column will be effectually held together. In Figure 1, I have shown the blocks as provided with grooves 10 through which keys of any desired form may be inserted and in the ends of all the blocks grooves 11 are formed which are adapted to register with corresponding grooves in the abutting ends of meeting blocks and into which the ends of the passages 7 open. Recesses 12 are provided in the ends of the blocks to establish communication with the grooves 11 and these openings or recesses 12 may be formed by drilling after the blocks have been delivered at the point of use inasmuch as circumstances may demand that they be formed at different sides of the block. After the blocks are assembled in a beam or girder or column, grout or liquid green cement is poured through these openings and will flow into and through the grooves 11 and the passages 7 so as to fill the same, the result being that, when this grout has set, a monolithic structure will be produced. It will be readily understood that the blocks may be superposed to form a column, as shown in Figures 2 and 3, and that the columns may be the width of a single block or of the width of two or more blocks, Figure 3 showing columns having a width equal to the combined width of two blocks. Figure 3 also shows the beam as consisting of superposed blocks and in Figure 7 I have shown a sectional arrangement of four blocks in a beam, Figure 3 also showing one of the blocks with a side of the same construction as its end to permit its connection with a smaller lateral beam. The grooves 11, as shown clearly in Figures 5, 6 and 7, follow the outline of the block and are disposed parallel with the sides thereof. Other grooves 13 are formed in the ends of the blocks and within the area defined by the grooves 11 so that an ample passage for the grout is provided and a strong key will be produced by the grout to connect the adjacent blocks. A reinforcing rod or frame 14 will preferably be placed in the grooves 11 when the blocks are assembled, as shown in Figure 7, and this reinforcement frame will extend parallel with the outer side of all the blocks and may be of such cross-sectional dimensions that it will enter the corresponding grooves in the opposed faces of abutting blocks. It may also be tied or otherwise engaged with the tie rods 8 inserted through the series of blocks so that all the blocks will be effectually tied together. I also provide keyways 15 in the outer surfaces of some of the blocks and when the blocks are assembled, as shown in Figure 7, these keyways are brought together so that a passage to be filled with grout will be produced which will form a very strong key binding the blocks against separation. When the blocks are arranged to form intersecting beams and girders, as shown in Figure 4, openings 16 are formed in the opposed sides of the blocks at the tops thereof through which grout may be poured to reach the several passages and keyways and bind the blocks together.

In Figure 1, I have shown the girder 6 provided with a longitudinal chamber 16 in its lower portion, and a plurality of tie rods 17 are disposed through and within the said passage. In the end of the girder, a vertical groove 18 extends to the upper end thereof and a reinforcement rod 19 is disposed within the said groove, the tie rods 8 of the series of blocks 3, 4 and 5 being connected by reinforcements 20 constructed with loops or eyes to engage around the said reinforcement rod 19. Grout is poured through the groove 18 to fill the same and the passage 16 and embed the reinforcement 19, the connection members 20, and the tie rods 17, as will be readily understood.

I have also, in Figure 1, shown the reinforcements 2 as extended above the tops of the blocks and formed into loops or eyes, as shown at 21, adapted to engage around longitudinal reinforcing tie rods 22 disposed in grooves 23 in the edges of floor slabs 24. When grout has been poured into the joints between the floor slabs and around the members 21 and 22, the floor slabs will be very effectually united with the beam and girder blocks.

Figure 8:
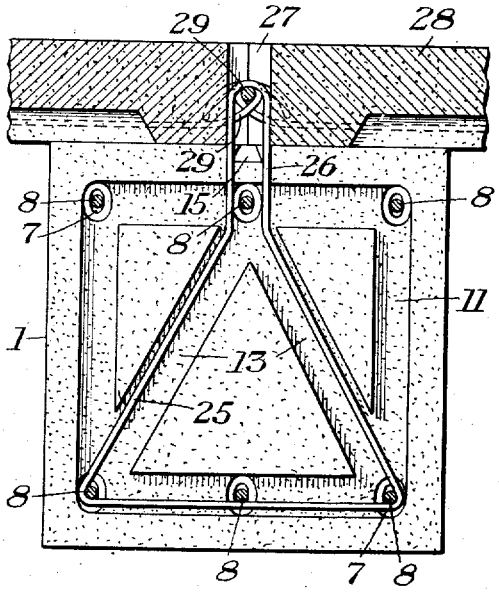
Figure 8 is an enlarged view showing the manner in which a floor may be united with the blocks forming a beam.
Figure 9:
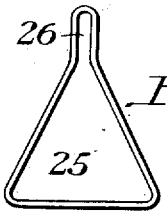
Figure 9 is a detail view of a reinforcement which may be employed.

In Figure 8, I have shown a reinforcement frame having a triangular portion 25 fitting within the grooves 11 and 13 of the block and an elongated loop portion 26 extending above the block to engage in recesses 27 in floor slabs 28 and be tied to the reinforcement rods 29 embedded in the slabs, as shown. Grout is poured into the recesses 27 so as to completely surround and embed the said connected reinforcements and thereby tie the slabs to the beam or girder.

From the foregoing description, taken in connection with the accompanying drawings, it will be seen that I have provided a means whereby the use of expensive lumber forms or molds in the field will be avoided and the cost of concrete buildings will be materially reduced inasmuch as the blocks may be obtained from a central plant which may be constantly employed in producing blocks for future use. The blocks may be very rapidly assembled and the pouring of the green cement or grout to effect a monolithic coupling of the separate blocks may be very rapidly and economically performed so that the completion of any operation in which the blocks are used will be expedited. When the grout has set, a very strong structure will result.

Figure 6:
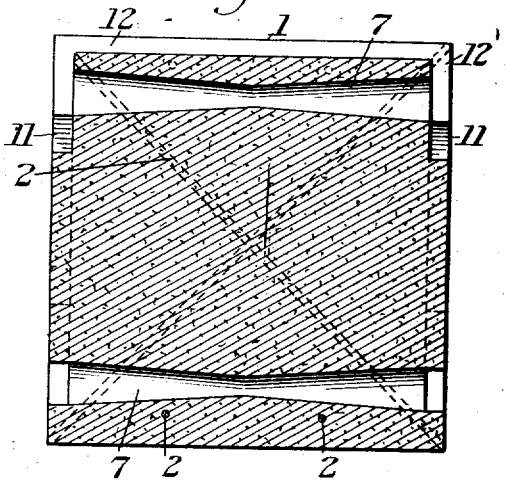
Figure 6 is a longitudinal section on the line 6—6 of Figure 5.
Figure 7:
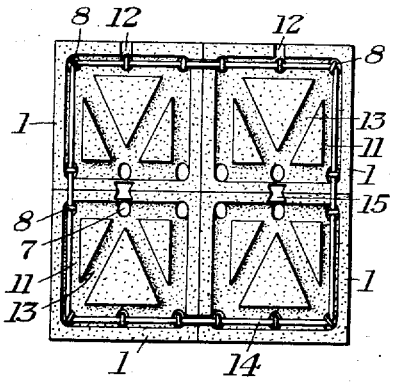
Figure 7 is a detail end elevation showing a plurality of the blocks assembled.

Upon reference to Figure 6, it will be noted that the passages 7 through the blocks are flared toward their opposite ends so that the overlapping or interengaging portions of the different reinforcements will be accommodated and will not unduly obstruct the flow of the grout, and it will also be noted that the ends of these passages are preferably elliptical, as shown in Figures 5 and 8 for the same reason. It is also to be noted that the girder end blocks are provided with holes through which vertical rods from the columns are passed and the beam ends are provided with holes through which girder rods are threaded.

After the blocks are brought together in a wall or other structure, grout may be poured through the openings in the upper sides of the blocks so as to flow around the reinforcing tie rods and fill all the grooves in the abutting ends of the blocks. When this grout is set, a monolithic structure will be produced. When the blocks are laid to form columns or poles, the passages therethrough will be arranged vertically and the reinforcing tie rods may be dropped through the vertically alined passages, as will be readily understood. Grout will, of course, be poured into the several passages and will find its way through the several grooves and keyways to firmly unite the blocks, and it will be understood that, after the blocks arrive at the point of use and before they are set in place, the openings or recesses 12 may be cut through one or more sides of the blocks according to the position in which the blocks are to be set, the said openings establishing communication with the end recesses and facilitating the pouring of grout into the joints between adjacent blocks. If the blocks are combined in a wall or other structure which has very little side pressure, the reinforcing tie rods may be omitted and the passages through the blocks will then serve as aids to ventilation and heat insulation.

The passages 7 are tunnel-like in character, that is to say, a cross section of the openings 7 represents an open space substantially completely surrounded by block material, as distinguished from blocks wherein an open sided channel or groove is provided.

Having thus described the invention, what is claimed as new is:

1. A construction member, comprising a plurality of series of blocks arranged end to end, the several series of blocks being arranged side by side with their joints registering and the blocks in each series being tied together by reinforcing means extending therethrough, said series of blocks being tied to each other at at least certain of the registering joints thereof by a reinforcing member positioned between the meeting end faces of the blocks at each such joint in a groove surrounding a bearing surface, substantially as described.

2. A construction member, comprising a plurality of series of blocks arranged end to end, the several series of blocks being arranged side by side with their joints registering and the blocks in each series being tied together by reinforcing means extending therethrough, said series of blocks being tied to each other at at least certain of the registering joints thereof by a reinforcing member positioned between the meeting end faces of the blocks at each such joint in a groove surrounding a bearing surface which is substantially flush with the marginal bearing surface outside such groove, substantially as described.

3. A construction member, comprising a plurality of series of blocks arranged end to end, the several series of blocks being arranged side by side with their joints registering and the blocks in each series being tied together by reinforcing rods extending therethrough, said series of blocks being tied to each other at at least certain of the registering joints thereof by a reinforcing member positioned between the meeting end faces of the blocks at each such joint in a groove surrounding a bearing surface, certain of the reinforcing rods intersecting such groove and being surrounded by said reinforcing member, substantially as described.

4. A construction member, comprising a plurality of series of blocks arranged end to end, the several series of blocks being arranged side by side with their joints registering and the blocks in each series being tied together by reinforcing rods extending therethrough, said series of blocks being tied to each other at at least certain of the registering joints thereof by a reinforcing member positioned between the meeting end faces of the blocks at each such joint in a groove surrounding a bearing surface, certain of the reinforcing rods intersecting such groove and being surrounded by said reinforcing member, the latter being embedded in grout filling such groove, substantially as described.

5. A construction comprising two connected members extending at an angle to each other and one abutting at one end against a face of the other, each of said members being composed of blocks arranged end to end, the blocks each having at least one tunnel-like hole extending therethrough and tied together by reinforcing means in the holes, substantially as described.

6. A construction comprising two connected members extending at an angle to each other and one abutting at one end against a face of the other, each of said members being composed of blocks arranged end to end, the blocks each having at least one tunnel-like hole extending therethrough and tied together by reinforcing means in the holes, the reinforcing means of one member extending transversely through the other member and serving to connect the two members together, substantially as described.

7. A construction comprising two connected members extending at an angle to each other and each composed of blocks of the same shape, the blocks in each member being arranged end to end and having at least one tunnel-like hole therethrough, the blocks of each member being tied together by reinforcing means extending through the holes, substantially as described.

8. A construction comprising two connected members extending at an angle to each other and each composed of blocks of the same size and shape, the blocks in each member being arranged end to end and having at least one tunnel-like hole therethrough, the blocks of each member being tied together by reinforcing means extending through the holes, substantially as described.

9. A construction comprising two connected members extending at an angle to each other and each composed of blocks arranged end to end, all of the blocks of said members being in the form each of a right parallelopipedon, each of the blocks having at least one tunnel-like hole extending therethrough, the blocks being tied together by reinforcing means extending through the holes, substantially as described.

10. In building construction, a beam formed of a plurality of courses of blocks, the blocks in each course being arranged end to end and tied together by reinforcing means extending therethrough and the several courses of blocks being tied to each other by reinforcing means embedded in the courses, substantially as described.

11. In building construction, a beam formed of a plurality of courses of blocks, the blocks in each course being arranged end to end and tied together by reinforcing means extending therethrough and the several courses of blocks being arranged with their joints registering and being tied to each other by reinforcing means embedded between meeting end faces of the blocks at at least certain of the registering joints, substantially as described.

12. In building construction, a member composed of precast blocks of cementitious material arranged end to end, each block having at least one tunnel-like hole therethrough, the blocks being tied together by reinforcing means extending through the holes, and slab-like members secured to the first mentioned member and united thereto by reinforcing members embedded in the first mentioned member, substantially as described.

13. In building construction, a member composed of precast blocks of cementitious material arranged end to end, each block having at least one tunnel-like hole therethrough, the blocks being tied together by reinforcing means extending through the holes, and slab-like members secured to the first mentioned member and united thereto by reinforcing members embedded in the first mentioned member at at least some of the joints of the first mentioned member, substantially as described.

14. In building construction a member composed of precast blocks of cementitious material arranged end to end, each block having at least one tunnel-like hole therethrough, the blocks being tied together by reinforcing means extending through such holes, and slab-like members connected to the first mentioned member by reinforcing members embedded in the first mentioned member at at least some of the joints between the blocks thereof, said last mentioned reinforcing members engaging the reinforcing means utilized for tieing the blocks together, substantially as described.

15. In building construction a member composed of precast blocks of cementitious material, arranged end to end, each block having at least one tunnel-like hole therethrough, the blocks being tied together by reinforcing means extending through the holes, slab-like members of cementitious material meeting over a side face of the first mentioned member and means uniting said slab-like members to the first mentioned member comprising reinforcements engaging the slab-like members at the meeting edges thereof and projecting thereto and embedded in the first mentioned member, substantially as described.

16. In building construction, a beam composed of precast blocks of cementitious material arranged end to end and tied together by reinforcing means extending therethrough, floor members of cementitious material meeting over the central portion of the beam and supported thereby, and means uniting said floor members to said beam comprising reinforcing members embedded in the floor members and projecting from the meeting edges thereof and other reinforcing members co-operating therewith and extending between meeting end faces of at least certain of the blocks of the beam and engaging the reinforcing means which ties the blocks of the beam together, substantially as described.

17. In building construction, the combination of blocks having vertical grooves in their opposed faces and recesses in communication with said grooves, said grooves and recesses being adapted to receive a plastic binder, and clamping means extending through all the blocks.

18. In building construction, the combination of blocks having vertical grooves in their opposed faces and recesses in communication with said grooves, said grooves and recesses being adapted to receive a plastic binder and the blocks being arranged in alined series, means for clamping the blocks in each series together, means for connecting said clamping means between the adjacent ends of the series, and a plastic binder around said connecting means.

19. In building construction, the combination of blocks having internal longitudinal passages through their lower portions and provided in their ends with vertically disposed grooves leading from the exterior of the blocks to said passages, clamping rods extending through said passages, means on the ends of the rods to clamp the blocks together, and a plastic binder filling the grooves and the passages.

20. In building construction, the combination of preformed concrete blocks having reinforcements embedded therein, a plastic binder between the meeting ends of adjacent blocks, and reinforcements embedded in said binder, some of the reinforcements projecting above the blocks.

21. In building construction, the combination of a plurality of concrete blocks disposed in series and provided in their opposed end faces with grooves spaced inwardly from their sides and each block having a filling opening extending from said grooves to the exterior of the block, tie rods inserted through the interior of all the blocks of the series, means on said tie rods for clamping the blocks together, and a plastic binder inserted through the openings in the tops of the blocks and filling the grooves in the ends of the same to form internal keys joining the abutting ends of the blocks.

22. In building construction, the combination of a plurality of concrete blocks disposed in series and each provided with internal passages therethrough extending longitudinally of the series, the blocks being further provided with communicating grooves in their opposed end faces spaced wholly from their sides with some grooves communicating with said passages, tie rods inserted through the said passages, reinforecements fitted in the grooves and about the tie rods, means on the tie rods for clamping the blocks together, and a plastic binder filling the grooves and the passages and embedding the tie rods and the reinforcements.

23. In building construction, the combination of a plurality of concrete blocks arranged in series and provided in their opposed ends with communicating grooves and in their opposed sides with registering longitudinal keyways, tie rods extending through all the blocks and clamping the blocks together, reinforcements disposed in the registering grooves and about the tie rods, and a plastic binder filling said grooves and said keyways and embedding the tie rods and the reinforcements.

24. In building construction, the combination of a plurality of concrete blocks, reinforcements embedded in the blocks, tie rods extending through alined blocks, a plastic binder between the meeting ends of adjacent blocks, reinforcements embedded in said binder, some of the reinforcements projecting above the blocks, blocks resting on the first-mentioned blocks at the sides of the projecting reinforcements, reinforcing tie rods engaging said projecting reinforcements, and a plastic binder joining the first-mentioned blocks and embedding said reinforcing tie rods and the projecting reinforcements engaged by them.

25. In building construction, the combination of blocks having internal longitudinal passages therethrough and provided in their opposed end faces with grooves spaced inwardly from their sides, the passages opening at their ends within the grooves, and a plastic binder filling the grooves and entering the passages.

26. In building construction, the combination of blocks provided in their end faces with grooves spaced inwardly from and parallel with their side faces and other grooves within the area defined by the first-mentioned grooves and communicating with said first mentioned grooves, and a plastic binder filling said grooves.

27. In building construction, a construction member composed of precast blocks of cementitious material arranged end to end and tied together by reinforcing means extending therethrough, slabs engaging a face of said member, said slabs having abutting edges extending along said face, reinforcing means extending between said abutting edges, and reinforcing means positioned between the meeting end faces of certain of the blocks of said member and engaging the reinforcing means extending through said member and the reinforcing means extending between said abutting edges.

28. In building construction, a member composed of precast blocks of cementitious material arranged end to end and tied together by reinforcing members extending through tunnel-like openings in the blocks, reinforced slab members terminating along a side face of the first mentioned member and reinforcing means connecting the slab reinforcements and the first mentioned reinforcing means, substantially as described.

In testimony whereof, I have hereunto set my hand.

ALBERT HENDERSON.